United States Patent Office

3,519,688
Patented July 7, 1970

3,519,688
PROCESS FOR THE MANUFACTURE OF UNSATURATED ALDEHYDES FROM OLEFINS
James Louis Callahan, Bedford, Berthold Gertisser, Cleveland Heights, and Joseph J. Szabo, Chagrin Falls, Ohio, assignors to The Standard Oil Company, Cleveland, Ohio, a corporation of Ohio
No Drawing. Continuation of application Ser. No. 510,417, Sept. 30, 1965, which is a division of application Ser. No. 190,038, Apr. 25, 1962, now Patent No. 3,248,340. This application Sept. 29, 1967, Ser. No. 672,424
Int. Cl. C07c 45/04
U.S. Cl. 260—604                                              6 Claims

---

ABSTRACT OF THE DISCLOSURE

A process for the manufacture of oxygenated hydrocarbons from olefinic hydrocarbon employing an improved oxidation catalyst consisting essentially of oxides of bismuth, molybdenum and optionally phosphorus, promoted by added oxides of boron and bismuth.

---

This is a continuation of Ser. No. 510,417, filed Sept. 30, 1965, which is a division of Ser. No. 190,038, filed Apr. 25, 1962, now Pat. No. 3,248,340.

This invention relates to the catalytic oxidation of olefins to oxygenated hydrocarbons, such as propylene to acrolein, using an improved oxidation catalyst consisting essentially of oxides of the elements bismuth and molybdenum, and optionally, phosphorus, promoted by oxides of boron and bismuth.

The Callahan, Foreman and Veatch U.S. Pat. No. 2,941,007 describes the oxidation of an olefin such as propylene and the various butenes with oxygen and a solid catalyst composed of the oxides of bismuth, molybdenum and silicon, and optionally, phosphorus. This catalyst selectively converts propylene to acrolein, isobutylene to methacrolein, $\alpha$- and $\beta$-butylene to methyl vinyl ketone and to butadiene, etc. High yields are obtainable, although in the case of the butenes, careful control of reaction conditions may be required in order to direct the reaction in favor of either methyl vinyl ketone or butadiene, depending upon which of these alternative products is desired.

The Idol, Jr., Pat. No. 2,904,580, employs the same catalyst to convert propylene, ammonia and oxygen to acrylonitrile, at approximately atmospheric pressures and elevated temperatures. Excellent conversions, usually in the range of 40 to 80%, nitrogen basis, of useful products are obtainable.

(I) THE CATALYST

In accordance with the instant invention, the catalytic activity of such bismuth oxide-molybdenum oxide catalysts is greatly enhanced or promoted by the combination therewith of a mixture of boron and additional bismuth in the form of their oxides, referred to hereinafter as promoters. The promoters in accordance with the invention are best applied by impregnation or surface coating of the catalyst, after its formation in accordance with the procedure described in Ser. No. 851,919, the disclosure of which is hereby incorporated by reference. Further, in accordance with the invention, it has been determined that a portion of the supplemental bismuth oxide promoter can be replaced with manganese oxide, and that phosphorus oxide can also be present as a supplemental oxide.

The proportions of boron oxide and bismuth oxide, with or without phosphorus oxide and/or manganese oxide, are important in obtaining the optimum enhanced activity. The boron oxide concentration, calculated as boron, should be within the range from about 0.5 to about 1% by weight; and the amount of bismuth oxide, calculated as bismuth, should be within the range from about 5% to about 10% by weight, although more than 10% can be used, if desired. If manganese oxide is employed, it can be used on a bismuth oxide equivalent weight basis, but not more than about one third of the promoter bismuth oxide, calculated as bismuth, can be replaced by manganese oxide.

While the catalyst of this invention may be employed without any support, it is desirable to combine it with a support. A preferred support is silica because the silica improves the catalytic activity of the catalyst. The silica may be present in any amount but it is preferred that the catalyst contain between about 25 to 75% by weight of silica. Many other materials such as alundum, silicon carbide, alumina-silica, alumina, titania and other chemically inert materials may be employed as a support which will withstand the conditions of the process.

The catalyst may comprise phosphorous, also present in the form of the oxide. Phosphorous will affect, to some extent, the catalytic properties of the composition, but the presence or absence of phosphorus has no appreciable effect on the physical properties of the catalyst. Thus, the composition can include from 0%, and preferably from at least 0.1%, up to about 5% by weight of phosphorous oxide, calculated as phosphorus.

The promoter is incorporated with the catalyst base by impregnation thereof, using an aqueous solution, dispersion, or suspension of a boron compound and of a bismuth compound, with or without a manganese compound, either the oxide, or a compound thermally decomposable in situ to the corresponding boron oxide, bismuth oxide, and manganese oxide, respectively, without formation of other deleterious metal oxide residue, for instance, ammonium phosphate, ammonium tetraborate, ammonium permanganate, manganese nitrate, bismuth nitrate, boric acid, bismuth hydroxide, manganese hydroxide, bismuth phosphate, and bismuth borate. The phosphorus-containing compounds also add phosphorus to the catalyst. After impregnation with such solution, employed in a concentration and amount to provide the desired amount of bismuth and boron, and optionally, manganese, the catalyst base is dried, and then calcined at a temperature above that at which the compounds applied are decomposed to the oxides. Temperatures in excess of 800° F. but below that at which the catalyst is deleteriously affected, usually not in excess of about 1050° F., can be used.

The basic catalyst composition comprises bismuth oxide and molybdenum oxide, the bismuth-to-molybdenum ratio Bi:Mo being controlled so that it is at all times above 1:3. There is no critical upper limit on the amount of bismuth, but in view of the relatively high cost of bismuth and the lack of an improved catalytic effect when large amounts are used, generally the atomic ratio bismuth to molybdenum Bi:Mo of about 3:1 is not exceeded. The nature of the chemical compounds which compose the basic catalyst is not known. The catalyst may be a mere mixture of bismuth and molybdenum oxides, with or without phosphorus oxide, but it seems more likely that the catalyst is a homogeneous micro mixture of loose chemical combinations of oxides of bismuth and molybdenum, with, optionally, phosphorus, and it is these combinations which appears to impart the desirable catalytic properties to this catalytic composition. The catalyst can be referred to as bismuth molybdate, or, when phosphorus is present, as bismuth phosphomolybdate, but this term is not to be construed as meaning that the catalyst is composed of these compounds.

The bismuth and boron, and optionally, manganese, compounds added thereto as promoters may or may not enter into the chemical composition of the catalyst. Bismuth added later with boron produces a different result from boron added to a catalyst composition containing more than the usual amount of bismuth, i.e., that stoichiometrically equivalent to the weight of added boron, and has a different function, since the enhanced catalytic effect is not obtained when boron oxide is combined with a composition previously containing the same excess of bismuth. Hence, the promoted catalytic effect may be due to some complex boron oxide-bismuth oxide combination formed on the surface of the catalyst. In any event, the boron and bismuth are present in the form of their oxides, when combined therewith later in accordance with the invention.

The bismuth molybdate catalyst composition of the invention may have the following composition ranges, as long as the atomic ratio of bismuth to molybdenum is above 1:3:

| Element: | Weight percent |
|---|---|
| Bismuth | 29.84–78.08 |
| Molybdenum | 11.32–47.29 |
| Oxygen | 9.96–26.84 |
| Phosphorus | 0–2.40 |

This same composition may be expressed in the form of the following empirical formula:

(1) $\quad\quad\quad Bi_a P_b Mo_{12} O_c$ where $a$ is 4 to 36, $b$ is 0 to 2, and $c$ is $$\tfrac{1}{2} n \cdot a + \tfrac{1}{2} m/i \cdot b + \tfrac{1}{2} p \cdot 12$$

and where $n$, $m$ and $p$ are the average valences of bismuth, phosphorus and molybdenum, respectively, in the oxidation states in which they exist in the catalyst, as defined by the empirical formula above. Thus $n$ may range from 2 to 3, $m$ is about 5 and $p$ may range from 4 to 6, which collectively make $c$ range from 28 to 94.

When silica is used as the support, the empirical formula is (2) $\quad\quad\quad Bi_a P_b Mo_{12} O_c \cdot (SiO_2)_{1 \text{ to } 600}$ where $a$, $b$ and $c$ are as defined above.

When the silica is present as about 30 to 70 weight percent of the final composition, the empirical formula is (3) $\quad\quad\quad Bi_a P_b Mo_{12} O_c \cdot (SiO_2)_{30 \text{ to } 150}$ where $a$, $b$ and $c$ are as defined above.

To this are to be added bismuth oxide and boron oxides, as such or as formed in situ from other added bismuth and boron compounds, so that the empirical formula of the promoted catalyst in accordance with the invention corresponds to the following:

(4) $\quad 85$–$93\%$ $(Bi_a P_b Mo_{12} O_c \cdot (SiO_2)_{0-600}) \cdot$
$\quad\quad\quad 5.5$–$11.5\%$ $Bi_2O_3 \cdot 1.5$–$3.5\%$ $B_2O_3$ The values of $a$, $b$ and $c$ are in accordance with the definitions given above.

When the atomic ratio of bismuth to molybdenum Bi:Mo is about 3:4, the empirical formula is (5) $\quad 85$–$93\%$ $(Bi_9 P_b Mo_{12} O_c \cdot (SiO_2)_{0-600}) \cdot$
$\quad\quad\quad 5.5$–$11.5\%$ $Bi_2O_3 \cdot 1.5$–$3.5\%$ $B_2O_3$ The values of $b$ and $c$ are as defined above.

When the silica is present as about 30 to 70 weight percent of the final composition, the empirical formula is (6) $\quad 85$–$93\%$ $(Bi_a P_b Mo_{12} O_c \cdot (SiO_2)_{30-150}) \cdot$
$\quad\quad\quad 5.5$–$11.5\%$ $Bi_2O_3 \cdot 1.5$–$3.5\%$ $B_2O_3$ where $a$, $b$ and $c$ are as defined above.

(II) OXIDATION OF OLEFINS TO ALDEHYDES AND KETONES THE REACTANTS

The reactants used in the oxidation to oxygenated compounds are an olefin or mixture thereof and oxygen.

By the term "olefin" as used herein and in the appended claims is meant the open-chain as well as cyclic olefins. Among the many olefinic compounds which may be utilized in accordance with the process of the invention, the following compounds are illustrative: propylene, butene-1, butene-2, isobutylene, pentene-1, pentene-2, 3-methyl-butene-1, 2-methyl-butene-2, hexene-1, hexene-2, 4-methyl-pentene-1, 3,3-dimethylbutene-1, 4-methyl-pentene-2, octene-1, cyclopentene, cyclohexene, 3-methylcyclohexene, etc. This invention is directed particularly to the oxidation of the lower alkenes (3 to 8 carbon atoms) but higher alkenes may also be utilized with efficacy. These compounds and their various homologs and analogs may be substituted in the nucleus and/or in the substituents in various degrees by straight-chain alicyclic or hetero-cyclic radicals. The process of the invention is applicable to individual olefins as well as to mixtures of olefins and also to mixtures of olefins with the corresponding or other saturated organic compounds.

The process of this invention is particularly adapted to the conversion of propylene to acrolein, isobutylene to methacrolein, α- or β-butylene to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

Straight-chain α-olefins of three or more carbon atoms, when oxidized according to the process of the invention, tend to yield the same products as the corresponding β-olefins. Thus, as stated above, α-butylene, as well as β-butylene, yields methyl vinyl ketone; and pentene-1, like pentene-2, yields ethyl vinyl ketone. It is believed that this results from isomerization of the α-olefins to the β-olefins under the reaction conditions.

It is surprising that the vinyl type carbonylic products obtained by the process of this invention are not always those which would be expected from the direct substitution of an oxygen atom for two hydrogen atoms in the allyl position, i.e., for two hydrogen atoms attached to a carbon atom separated from the double bond by an intervening carbon atom. For in the latter case β-butylene would form crotonaldehyde and not methyl vinyl ketone. Instead, the reaction appears to be initiated at the double bond and proceeds with the elimination of a hydrogen atom in the allyl position and a change in position of the double bond.

The olefins may be in admixture with other hydrocarbons, for example, a propylene-propane mixture may constitute the feed. It is an advantage of our process that the propane is not readily oxidized and passes through the reaction largely as an inert diluent. This makes it possible to use ordinary refinery streams without special preparation.

PROCESS CONDITIONS

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atomspheric, i.e., −10 to 100 p.s.i.g., temperatures in the range of 500 to 1000° F. may be advantageously employed. However, the process may be conducted at other pressures, and in the case where super atmospheric pressures, e.g., above 100 p.s.i.g., are employed somewhat lower temperatures are feasible. In the case where this process is employed to convert propylene to acrolein, a temperature range of 750 to 850° F. has been found to be optimum at atmospheric pressure.

The apparent contact time employed in the process is not critical and it may be selected from a broad operable range which may vary from 0.1 to 200 seconds. The apparent contact time may be defined as the length of time in seconds which the unit volume of gas measured under the conditions of reaction is in contact with the apparent unit volume of the catalyst. It may be calculated for example from the apparent volume of the catalyst bed, the average temperature and pressure of the reactor, and the flow rates of the several components of the reaction mixture. The optimum contact time will, of course, vary depending upon the olefin being treated, but in the case of propylene the preferred apparent contact time is 1 to 15 seconds.

A molar ratio of oxygen to olefin between about 5:1 to 0.5:1 generally gives the most satisfactory results. For the conversion of propylene to acrolein, a preferred ratio of oxygen to olefin is about 1:1. The oxygen used in the process may be derived from any source: however, air appears to be the least expensive source of oxygen and it is preferred for that reason.

We have also discovered that the addition of water to the reaction mixture has a marked beneficial influence on the course of the reaction in that it improves the conversion and the yield of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of 1:1 to 1:10 will give very satisfactory results and a ratio of 1:3 to 1:5 has been found to be optimum when converting propylene to acrolein. The water, of course, will be in the vapor phase during the reaction.

Inert diluents such as nitrogen, carbon dioxide, and saturated hydrocarbons such as ethane, propane, and butane and pentane may be present in the reaction mixture; however, no beneficial effect on the reaction has been observed in the presence of such diluents. Processes are not contemplated in which diluents are present which would react to form compounds other than those consisting of the elements carbon, hydrogen and oxygen.

In general, any apparatus of the type suitable for carrying out oxidation reactions in the vapor phase may be employed for the execution of the process. It may be operated continuously or intermittently and may be a fixed bed with a pelleted catalyst. We prefer, however, to employ a reactor containing a so-called "fluidized" bed of catalyst for the reason that the temperature of the reaction must be closely controlled. It has been determined that without such temperature control the oxidation will proceed to the formation of carbon dioxide and water at the expense of the desired product. A "fluidized" catalyst bed simplifies the problem of temperature control since coils through which water or other heat transfer medium is circulated may be conveniently disposed in the bed to control the temperature.

As stated above, pressures other than atmospheric may be employed in this process but it is generally preferred to operate at or near atmospheric pressure since the reaction proceeds well as such pressures and the use of expensive high pressure equipment is avoided.

The reactor may be brought to the reaction temperature before or after the introduction of the vapors to be reacted. In large scale operation, it is preefrred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The unsaturated carbonyl product or products may be isolated from the gases leaving the reaction zone by any appropriate means, the exact procedure in any given case being determined by the nature and quantity of the reaction products. For example, the excess gas may be scrubbed with cold water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cold water quench of the gases which of itself will serve to separate a significant amount of the carbonyl products. Where molecular oxygen is employed as the oxidizing agent in this process, the resulting product mixture remaining after the removal of the carbonyl product may be treated to remove carbon dioxide with the remainder of the mixture comprising any reacted olefin and oxygen being recycled through the reactor. In the case where air is employed as the oxidizing agent in lieu of molecular oxygen, the residual product after separation of the carbonyl product may be scrubbed with a nonpolar solvent, e.g., a hydrocarbon fraction, in order to recover unreacted olefin and in this case the remaining gases may be discarded. An inhibitor to prevent polymerization of the unsaturated products, as is well known in the art, may be added at any stage.

The following example, in the opinion of the inventors, represent preferred embodiments of their invention:

EXAMPLE I

A bismuth silicophosphomolybdate catalyst base was prepared by the following procedure:

74 g. of an 85% phosphoric acid was added to 8330 g. of an aqueous silica sol containing 30% silica. Next, 2800 g. of bismuth nitrate was dissolved in a solution made by diluting 160 ml. of 70% nitric acid to 1540 ml. with distilled water. The bismuth nitrate solution was then added to the silica sol. Next, 1360 g. of ammonium molybdate was dissolved in 1540 ml. of distilled water, and this solution added to the silica sol. The resulting catalyst slurry was dried in an oven at 200° F. for 24 hours and then calcined in a furnace at 800° F. for 24 hours. After cooling, the catalyst was ground into particles, and screened through a 10-mesh screen. A portion of the 8–10 mesh material was then made into tablets, while the remainder was retained for use as a control, designated hereinafter as Control A.

The final catalyst composition corresponded to the empirical formula $Bi_9PMo_{12}O_{52} \cdot (SiO_2)_{65}$, having the following composition:

| Element: | Weight percent |
|---|---|
| Bismuth | 24.2 |
| Phosphorus | 0.4 |
| Molybdenum | 14.8 |
| Silicon | 23.4 |
| Oxygen | 37.2 |

This tabletted catalyst was then impregnated with promoters in accordance with the invention, by the following procedure:

81.8 g. of boric acid was dissolved in hot water and diluted up to 420 ml. This hot solution was used to impregnate 400 g. of the tabletted catalyst prepared as described above, dipping tablets of the catalyst contained in a wire basket in the boric acid solution for 4 minutes, then removing and draining them for 4 minutes. By this procedure, 120 ml. of the boric acid solution was absorbed by the catalyst, equivalent to 23 g. $H_3BO_3$. The wet catalyst was dried overnight, and a portion was set aside, for use later as Control C.

The remainder of the boric-acid impregnated catalyst was mixed well with a solution prepared by dissolving 47 g. of bismuth nitrate $Bi(NO_3)_3 \cdot 5H_2O$ in 40 cc. of concentrated nitric acid, specific gravity 1.42, diluting to 120 cc. with water. Another portion of the base catalyst (Control A), not previously impregnated with boric acid solution, was then impregnated with bismuth nitrate solution in the same way. This was marked Control B. Again, the catalyst was dried at 120° C. overnight.

Controls B and C and the twice impregnated catalyst of the invention then were calcined in air for 14 to 16 hours at 800° F. Finally, the three calcined catalysts were ground and screened, to obtain a size fraction in the 8 to 10 mesh range.

Thus, Control B contained 5% added bismuth Control C 1% boron, Control A neither, and the catalyst of the invention, 5% added bismuth and 1% added boron together.

The bismuth and boron promoted catalyst was employed in fixed-bed form for the conversion of propylene to acrolein. During the reaction the reactor was maintained at a temperature of 825° F. at atmospheric pressure. The contact time with the catalyst was approximately one second. The feed molar molar ratios were air/$H_2O$/propylene/nitrogen 5/6/1/32. Approximately 58% of the propylene feed was converted to acrolein and about 29% of the propylene was unreacted. This unreacted material could be recycled. The remainder of the product consisted of carbon oxides, minor amounts of low molecular weight carbonylic compounds, and organic acids.

All percentages in the specification and claims are by weight, in the case of the catalyst composition, and by volume in the case of gases.

What is claimed is:

1. The process for the manufacture of carbonyl compounds from olefinic hydrocarbons which comprises the step of contacting in the vapor phase at a temperature within the range from about 500 to about 1000° F. at which carbonyl compound formation proceeds a mixture of olefinic hydrocarbon and oxygen in a molar ratio oxygen to olefinic hydrocarbon within the range from about 5:1 to about 0.5:1 with a catalyst base composition selected from the group consisting of bismuth molybdate and bismuth phosphomolybdate in which the atomic ratio ratio of bismuth to molybdenum is above 1:3, promoted by a mixture of oxides of boron and bismuth in the respective proportions of about 0.5 to about 1%, calculated as boron, and from about 5 to about 10%, calculated as bismuth.

2. A process in accordance with claim 1, in which the olefinic hydrocarbon is propylene.

3. A process in accordance with claim 1, in which the catalyst base composition is bismuth phosphomolybdate.

4. A process in accordance with claim 1, in which the catalyst base composition is promoted by a mixture of oxides of boron and bismuth including manganese oxide in an amount up to about one-third the weight of the bismuth oxide promoter.

5. A process in accordance with claim 1, in which the catalyst base composition also includes silica, the silica, being present in an amount from about 25 to about 75% by weight of the catalyst base composition.

6. A process in accordance with claim 5, in which the catalyst base composition is bismuth phosphomolybdate.

References Cited

UNITED STATES PATENTS 2,941,007  6/1960  Callahan et al. _____ 260—604

FOREIGN PATENTS 839,808  6/1960  Great Britain.

LEON ZITVER, Primary Examiner

R. H. LILES, Assistant Examiner

U.S. Cl. X.R.

252—432; 260—586, 597